United States Patent Office 2,725,372
Patented Nov. 29, 1955

2,725,372

LIGHT SENSITIVE UNSATURATED ESTERS OF POLYVINYL ALCOHOL

Louis M. Minsk, Rochester, N. Y., assignor to Eastman Kodak Company, Rochester, N. Y., a corporation of New Jersey No Drawing. Application January 20, 1951,
Serial No. 207,052

3 Claims. (Cl. 260—91.3)

This invention relates to the preparation of esters of polyvinyl alcohol and more particularly to cinnamic acid esters of polyvinyl alcohol.

A common method for the preparation of polyvinyl esters involves the polymerization of the monomeric vinyl ester by heating and the reaction can be accelerated by the addition of polymerization catalysts such as benzoyl peroxide. Polymerization can also be effected by irradiation of the vinyl ester with ultra-violet light.

As might be expected, a vinyl ester of an unsaturated acid such as vinyl cinnamate can be polymerized, if with some difficulty. That is, in the presence of benzoyl peroxide, vinyl cinnamate does not polymerize at moderate temperatures but if a composition containing vinyl cinnamate and an adequate amount of catalysts is heated to a temperature of the order of 100° C., polymerization commences and proceeds rapidly with the formation of an insoluble gel as the final product. Seemingly, an insoluble product results because polymerization takes place more or less simultaneously at the unsaturated carbon atoms of both the vinyl group and the cinnamoyl group of vinyl cinnamate, rather than only at the vinyl group. The result is a cross-linked polymer of the well known type insoluble in organic solvents, effectually insensitive to light and, therefore, not usable in the procedure for which my resin is adapted and customarily used for applying resists to and subsequently removing the unexposed portions from printing plates.

Similarly, when an attempt was made to prepare a soluble interpolymer of vinyl cinnamate, for example, with maleic anhydride, polymerization was difficult to initiate and when polymerization did commence, it proceeded with the formation of a solvent-insoluble product.

I have discovered that the only satisfactory method for forming a solvent-soluble cinnamic acid ester of polyvinyl alcohol includes esterifying a polyvinyl alcohol with a cinnamic acylating agent. The result is the formation of a solvent-soluble light-sensitive cinnamic acid ester of polyvinyl alcohol appearing to be substantially free of cross linkage and having the general structure

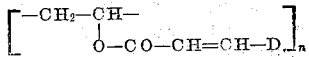

in which D is an aryl group of the benzene series, for example, phenyl, chlorophenyl, etc., and $n$ is a whole number depending upon the degree of polymerization of the origial polyvinyl alcohol.

Important characteristics of the cinnamic acid esters prepared in the manner of my invention reside in their solubility and light-sensitivity. That is, the esters are solvent soluble and sensitive to light in contradistinction to polymerized vinyl cinnamate containing cross linkages, and can be used in the photomechanical processes. Cross-linked polyvinyl cinnamates which only swell in solvents, may still possess a sensitivity to light, i. e. they may be further cross-linked, however, this property is useless because one cannot differentiate by solubility differences between different degrees of insolubility. Also, the esters can be sensitized to light with a variety of compounds such as nitro-anilines as disclosed in the Minsk et al. application Serial No. 148,684, filed March 9, 1950, now U. S. Patent No. 2,610,120, granted September 9, 1952 and with quinones, benzanthrones and triphenyl methane dyes as disclosed in the Minsk et al. applications Serial Nos. 207,050, 207,049, and 207,048, now U. S. Patents 2,670,286, 2,670,285 and 2,690,966, respectively; and with the ketone compounds of Minsk et al. application Serial No. 207,051, now U. S. Patent 2,670,287, all filed concurrently herewith.

When it is desired to obtain a less than fully esterified cinnamic acid ester of a polyvinyl alcohol, I can regulate the amount of cinnamoyl group introduced into the polyvinyl alcohol molecule by selection of the amount of cinnamoyl compound used in esterification, or preferably by de-esterifying the fully esterified polyvinyl cinnamate of the above formula.

One object of my invention is to provide a method for the preparation of cinnamic acid esters of polyvinyl alcohol which are soluble in organic solvents and sensitive to light. Another object is to provide a method for preparing a solvent-soluble light-sensitive substantially fully esterified cinnamic acid ester of polyvinyl alcohol. A further object is to provide a method of making partially esterified cinnamic acid esters of polyvinyl alcohol. Other objects of my invention will appear from the following description.

The objects of my invention are accomplished by the preparation of cinnamic acid esters of polyvinyl alcohol and particularly solvent-soluble and light-sensitive cinnamic acid esters of polyvinyl alcohol.

The following examples are given of my methods for preparing light-sensitive solvent-soluble cinnamic acid esters of polyvinyl alcohol.

Polyvinyl cinnamate 11 grams of polyvinyl alcohol were heated overnight on a steam bath with 100 cc. of pyridine. One hundred cc. of pyridine were then added and the suspension cooled to 50° C. 50 grams of a commercial grade of cinnamoyl chloride were added portionwise with agitation, during which time some heat was evolved and a precipitate formed. The reaction mixture was then heated at 50° C. under a condenser provided with a calcium chloride tube, and after four hours, during which time the suspension was occasionally agitated, a viscous dope was obtained. Dilution of the dope wtih acetone was followed by filtration and precipitation in water. The resultant resin was purified by extensive washing with water until free from chloride and was then dried. A yield of 31.5 grams of polyvinyl cinnamate was obtained.

A larger batch of polyvinyl cinnamate was made by the same method as follows:

660 grams of medium viscosity polyvinyl alcohol were heated with six liters of a commercial grade of pyridine on a steam bath for 16 hours, followed by cooling, and the addition of six liters of pyridine. Three kg. of cinnamoyl chloride were then added with stirring and cooling. After the addition of the cinnamoyl chloride, the reaction mixture was heated at 50° C. for four hours with stirring, diluted with 10 liters of acetone and the resultant solution precipitated in 36 gallons of distilled water. After stirring for one hour, the resultant polyvinyl cinnamate resin was filtered off and washed with 17 gallons of distilled water. Five such batches of resin were combined and given four additional 1-hour washes with distilled water, the resin filtered off and dried at room temperature to constant weight. The yield was 25.5 pounds of resin having an analysis indicating that the process was productive of polyvinyl cinnamate containing 99.4 mol. percent (approximately 100 mol. percent) of vinyl cinnamate. The resin was soluble in a variety of solvents such as acetone, methyl glycol acetate alone or in admixture with xylene, mixtures of methyl glycol acetate, xylene and isopropyl alcohol, etc. Since the resin was not only soluble in organic solvents but was also sensitive to light, it was found to be useful in the photomechanical processes of the above-mentioned copending inventions.

In view of the analysis of the resin prepared as above, the resin contains only cinnamic acid acyl groups and is substantially free of unesterified hydroxyl groups. In the above process it will be noted that an excess of cinnamoyl chloride equal to about 0.1 molecular equivalent was utilized. Generally, it is advisable to use an excess of this order; however, the excess is dependent in part upon the amount of water contained in the particular polyvinyl alcohol in use, the purity of the acid chloride and the extent to which moisture is excluded from the reaction mixture. With dry polyvinyl alcohol and pure acid chloride and dry diluent, substantially equal molecular proportions of the two reactants can be used. Valuable solvent-soluble cinnamic acid esters can be obtained by heating the reactants in the absence of an acid binding agent such as pyridine, for example, using an inert solvent as the diluent; however, the process is less preferred.

When it is desired to make a light-sensitive cinnamic acid ester of a polyvinyl alcohol containing less than about 100 mol. percent vinyl cinnamate, e. g., 60 to 100 mol. percent vinyl cinnamate, I can reduce the amount of the cinnamic acid chloride used and otherwise produce the resin in the manner of the above example or the reaction between equal molecular proportions of the reactants can be stopped at the desired point by precipitation of the reaction mixture in water. Thus, especially valuable solvent-soluble light-sensitive cinnamic acid esters of polyvinyl alcohols are obtained by acylation of one molecular equivalent of polyvinyl alcohol with from about 0.6 to 1.1 molecular equivalent of the cinnamic acid halide. When less than about 0.6 molecular equivalent of cinnamic acid halide is used, the products are difficultly soluble and have reduced light-sensitivity and the method is principally useful for making preformed coatings or articles which need not be redissolved. However, it is possible to further esterify a partially esterified polyvinyl cinnamate containing less than 60 mol. percent vinyl cinnamate by a second esterification in the presence of another acid chloride such as acetyl chloride or propionyl chloride, etc. The result is a soluble mixed ester of two acids. Similarly, I can esterify, with a cinnamic acid halide such as cinnamic acid chloride, a partially alkylated or esterified polyvinyl alcohol, or a completely or partially hydroxy alkylated polyvinyl alcohol, for example, a partially alkylated ethyl ether of polyvinyl alcohol, a hydroxy ethyl ether or partially hydroxy alkylated hydroxy ethyl ether of polyvinyl alcohol and partially hydrolyzed polyvinyl esters such as partially hydrolyzed polyvinyl acetate.

Accordingly, where I refer to "polyvinyl alcohol" I mean a hydrolyzed polyvinyl ester substantially free of acyl groups and "a polyvinyl alcohol" includes any of the mentioned derivatives of polyvinyl alcohol as well.

In the above process of making a cinnamic acid ester of polyvinyl alcohol, other acid binding agents may be used in place of pyridine, e. g., quinoline, isoquinoline, dialkylanilines such as diethylaniline, trialkylamines such as triethylamine, and N-alkylpiperidines. Of course the binding agent may be used in excess especially when it also serves as a diluent. The temperature of the reaction mixture is especially not critical although it is preferable to maintain it below the boiling point or reflux temperature of the reaction mixture.

Other cinnamic acid halides may be used in place of or in conjunction with cinnamic acid chloride or mixtures of these acid halides can be used in making solvent soluble cinnamic acid esters, e. g., o-chloro- or m-nitrocinnamic acid halides, such as o-chlorocinnamic acid chloride, m-nitrocinnamic acid chloride, cinnamic acid bromide, alkylated cinnamic acid halides, α- and β-phenylcinnamic acid chlorides, as shown by the following examples.

Polyvinyl o-chlorocinnamate o-Chlorocinnamic acid was made by the method of Lasch, Mon. für Chem. 34 1654 (1913) by combining the following in a vessel equipped with a reflux condenser and stirrer:

200 g. of o-chlorobenzaldehyde, 300 g. of acetic anhydride and 100 g. of freshly melted potassium acetate. The reaction mixture was stirred and heated cautiously until the most intense portion of the reaction was over. The reaction was most evident at 135–140° C. (about ¾ hour after heating was started). The reaction mixture was then brought to reflux temperature (150°) and kept there for from 7 to 8 hours. At this time the reaction mixture was poured into about two liters of water. The granular mass obtained was separated from the liquid by filtration. The solid was put in a 3-liter flask along with 150 g. of sodium hydroxide and dissolved in 500 ml. water. The solution was steam distilled until aldehyde free. The aldehyde-free solution was cooled to about 10° C. A brownish-yellow granular material was formed which was redissolved in water. The solution was made just acid with dilute hydrochloric acid. The resulting material was soluble in ethyl alcohol and was recrystallized from ethyl alcohol.

M. P. _____ ° C __ 208–210  
Yield _____ g __ 125  
Per cent C _____ 58.9  
Per cent H _____ 3.6  
Per cent Cl _____ 19.1 o-Chlorocinnamoyl chloride was prepared as follows:

To 124 g. of o-chlorocinnamic acid in an all glass reflux outfit equipped for anhydrous conditions, 650 ml. of thionyl chloride were added. The mixture was refluxed for 2 hours. A dark brown solution resulted. The excess thionyl chloride was drawn off under vacuum leaving a dark solid when the residue was cooled to room temperature. The chloride was distilled off under vacuum and crystallized to a white solid.

B. P. _____ 154–6° C. at 17 mm.  
M. P. _____ 37° C.  
Yield _____ 105 g.

Polyvinyl o-chlorocinnamate was prepared as follows:

Eleven g. of polyvinyl alcohol were put in all glass reflux outfit equipped with a CaCl₂ tube on a steam bath overnight with 100 ml. of dry pyridine.

The mixture was cooled to room temperature and 60.5 g. (0.3 mole) of molten o-chlorocinnamoyl chloride were added gradually over a period of 15 minutes while the mixture was manually stirred. The reaction mixture was then stoppered and put in a 50° C. bath. After a 5-hour reaction period, the reaction mixture was removed and thinned with acetone, filtered and precipitated in water. The precipitate was rinsed with water until the rinse water was chloride free. The polymer was put in a vacuum desiccator under constant water pump vacuum. The desiccator was covered with a black cloth during the drying period.

Yield _____ 38 g.—soluble in chlorobenzene or 1:1 benzene acetone.  
Per cent C _____ 62.8  
Per cent H _____ 4.8  
Per cent Cl _____ 16.6

The analyses indicated that the resin contained 71 mol. percent of polyvinyl-o-chlorocinnamate.

Polyvinyl α-phenylcinnamate

α-Phenylcinnamoyl chloride was prepared as follows:

Twenty g. of α-phenylcinnamic acid were dispersed in 150 g. of thionyl chloride in an all glass reflux outfit equipped with a mechanical stirrer and CaCl₂ tubes in all openings to the atmosphere. The apparatus was kept in an ice bath during the reaction and throughout the entire procedure. After the mixture had been stirred for two hours it became a clear straw-colored solution. The thionyl chloride was distilled off for 9 hours under constant water pump vacuum followed by 4 hours under high vacuum pump vacuum. Two hundred ml. of benzene were added and distillation, just above the freezing point of benzene, under a high vacuum pump vacuum was continued for 14 hours. Yield=14.7 g. The product gave a negative test for sulphur.

Polyvinyl α-phenyl cinnamate was prepared as follows:

Two and two-tenths g. of polyvinyl alcohol were put in an all glass reflux outfit equipped with a CaCl₂ tube, on a steam bath overnight with 25 ml. of dry pyridine. The mixture was then stirred manually and kept at 10° C. while 14.7 g. of α-phenylcinnamoyl chloride were added. When the addition was completed, the reaction mixture was diluted with 50 ml. of pyridine and allowed to stand, sealed, at room temperature for about ½ hour. A light straw-colored dope began to form. The mixture was then put on a 50° C. bath and shaken frequently for one hour. A straw-colored dope containing some solids resulted. The dope was diluted with acetone, filtered and precipitated in water. Washing was continued until the rinse waters were chloride free. The product was dried in a vacuum desiccator under constant water pump vacuum. The desiccator was covered with a black cloth during the drying period.

Yield_____ 12.9 g.—product soluble
in chlorobenzene
Per cent C_____ 78.9
Per cent H_____ 5.6
Mole per cent as polyvinyl
α-phenylcinnamate_____ 83.4

The analyses indicated that the resin contained 83.4 mol. per cent of polyvinyl α-phenylcinnamate.

*Polyvinyl β-phenylcinnamate*

β-Phenylcinnamoyl chloride was prepared by the method of Kharasch, Kane and Brown, J. A. C. S. 64 333 (1942). Forty six and nine-tenths grams of β-phenylcinnamoyl chloride thus prepared was poured with manual stirring into a mixture of 4.4 g. of polyvinyl alcohol (which had been swollen overnight at 100° C. in 150 cc. of anhydrous pyridine), the whole being kept at about 10° C. A brownish dope formed as the acid choride was added which set up to a blackish-red gel. The gel was dissolved in 300 ml. of pyridine, and the dope further thinned with pyridine, filtered, precipitated in water and the resultant resin leached with water until chloride free, then dried in a vacuum desiccator in absence of light. The yield was 17.4 g. resin soluble in chlorobenzene to which a slight amount of acetone had been added. An analysis of C=76.0% and H=6.2% indicated that the polyvinyl β-phenylcinnamate resin contained 71 mol. per cent β-phenylcinnamic acid ester groups.

The preferred method of making a light-sensitive cinnamic acid ester of polyvinyl alcohol containing from about 60 to less than 100 mol. per cent of cinnamoyl ester groups, includes first making a soluble cinnamic acid ester of polyvinyl alcohol by the above methods containing more than 60 mol. percent cinnamoyl ester groups, then de-esterifying the resultant ester until it contains the desired amount of ester groups such as at least 60 mol. percent of ester groups. For this purpose, mixed esters such as mentioned may be employed although I prefer to use substantially fully esterified polyvinyl cinnamate. By this method I am more readily able to control the acyl content of the product than when such esters are obtained by direct acylation of polyvinyl alcohol, partly because variations in purity of the reactants, e. g., moisture content of the reactants, is not as critical. A suitable method for de-esterifying polyvinyl cinnamate is given as follows:

100 grams of the polyvinyl cinnamate prepared as above were dissolved in 500 cc. of 1,4-dioxane and 200 cc. of methanol, followed by the addition of one gram of metallic sodium in 100 cc. of methanol. 300 cc. of 1,4-dioxane were then added with stirring until the mixture was homogeneous. Samples were then removed at intervals, precipitated in distilled water, washed with water until free of alkali and then dried under vacuum. Samples taken at the intervals had the analysis shown in the following table based on carbon analyses:

| Sample No. | Sampling Interval (Min.) | Vinyl Cinnamate (Wt. Percent) | Vinyl Cinnamate (Mol. Percent) |
| --- | --- | --- | --- |
| 1 | 5 | 96.9 | 90.5 |
| 2 | 12 | 96.4 | 89.0 |
| 3 | 17 | 94.8 | 87.5 |
| 4 | 24 | 90.6 | 74.2 |
| 5 | 31 | 85.8 | 64.3 |
| 6 | 44 | 83.2 | 59.6 |

De-esterification of polyvinyl cinnamate may be carried out in a similar manner using in place of the alkali metal alcoholate, other de-esterification catalysts such as hydrochloric acid, sodium hydroxide, and sulfuric acid. However, the method given in detail above gives reproduceable results.

The cinnamic acid esters of polyvinyl alcohol containing only cinnamic acid acyl groups within the range of about 87 to 100 mol. per cent are most valuable because of their superior solubility in organic solvents and light-sensitivity. However, as indicated above, when considering mixed esters, products of good solubility and light-sensitivity result when the esters contain substantially less than 60 mol. per cent cinnamoyl groups and the balance is a different acyl group.

In the above processes, it is advisable but not absolutely essential that the esterification or de-esterification procedures be carried out under reduced illumination. The usual glass reaction vessels appear to filter out sufficient of the actinic rays to which the resins are sensitive. Also, the resins are less sensitive to light when in solution or fibrous form than when coated as continuous films.

What I claim is:

1. A light-sensitive organic solvent soluble film-forming polymer prepared by the esterification of polyvinyl alcohol with a cinnamic acid halide and consisting of from 60 to 99.4 mol percent of recurring structural units having the general formula

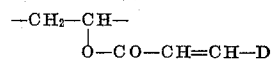

wherein D represents a univalent aromatic monocyclic radical of the benzene series whose free valence belongs to the aromatic nucleus, the remaining recurring structural units of the polymer being vinyl alcohol structural units.

2. A light-sensitive organic solvent soluble film-forming polymer prepared by the esterification of polyvinyl alcohol with a cinnamic acid halide and consisting of from 60 to 99.4 mol percent of recurring structural units having the general formula

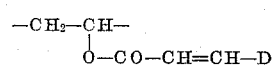

wherein D represents a member of the class consisting of phenyl, m-nitrophenyl and o-chlorophenyl groups, the remaining recurring structural units of the polymer being vinyl alcohol structural units.

3. A light-sensitive organic solvent soluble film-forming polymer prepared by the esterification of polyvinyl alcohol with a cinnamic acid halide and consisting of from 60 to 99.4 mol percent of recurring structural units having the formula $$-CH_2-CH- \\ \phantom{-CH_2-}|\phantom{xxx} \\ \phantom{-CH_2-}O-CO-CH=CH-C_6H_5$$

the remaining recurring structural units of the polymer being vinyl alcohol structural units.

References Cited in the file of this patent

UNITED STATES PATENTS

| | | |
|---|---|---|
| 2,308,236 | Pollack et al. | Jan. 12, 1943 |
| 2,318,959 | Muskat et al. | May 11, 1943 |

OTHER REFERENCES

Blick: J. A. C. S. vol. 45, page 1562–1566, June 1923.

Carothers: Collected Papers on Polymerization, pages 24–27 (1940).

Honig et al.: The Van Nostrand Chemist's Dictionary, Van Nostrand Co., N. Y., page 44.

Chem. Abstr., vol. 27, 3746 (1935) re. I. G. German Patent 577,284.